March 10, 1970 TRYGVE MIKKELSEN 3,499,291
BOOM FOR SCREENING IN AND COLLECTING UP OF POLLUTION ON WATER
Filed Nov. 5, 1968 2 Sheets-Sheet 1
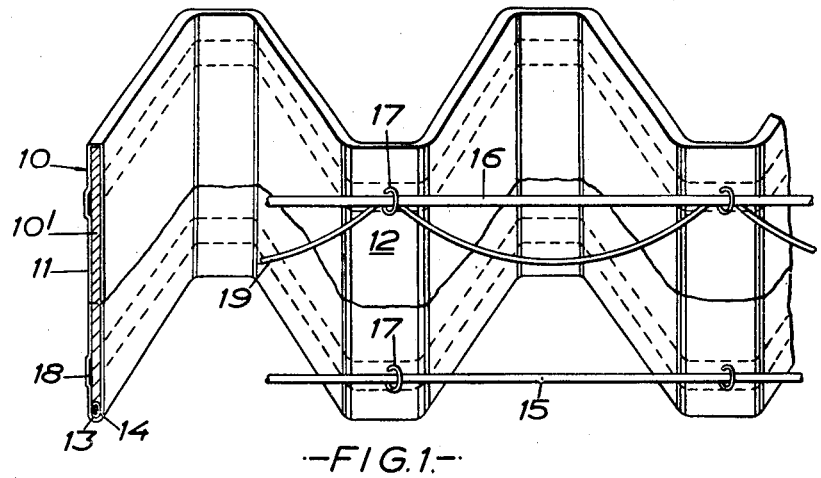
-FIG.1.-
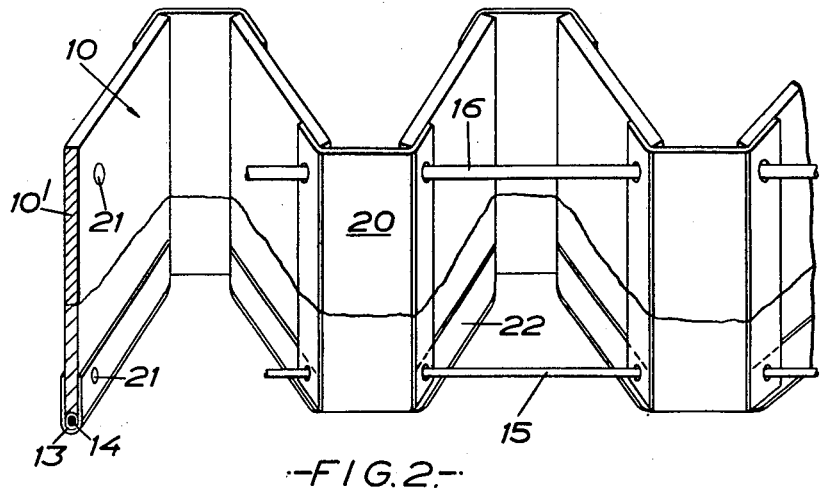
-FIG.2.-
INVENTOR:
TRYGVE MIKKELSEN
BY
ATTORNEY

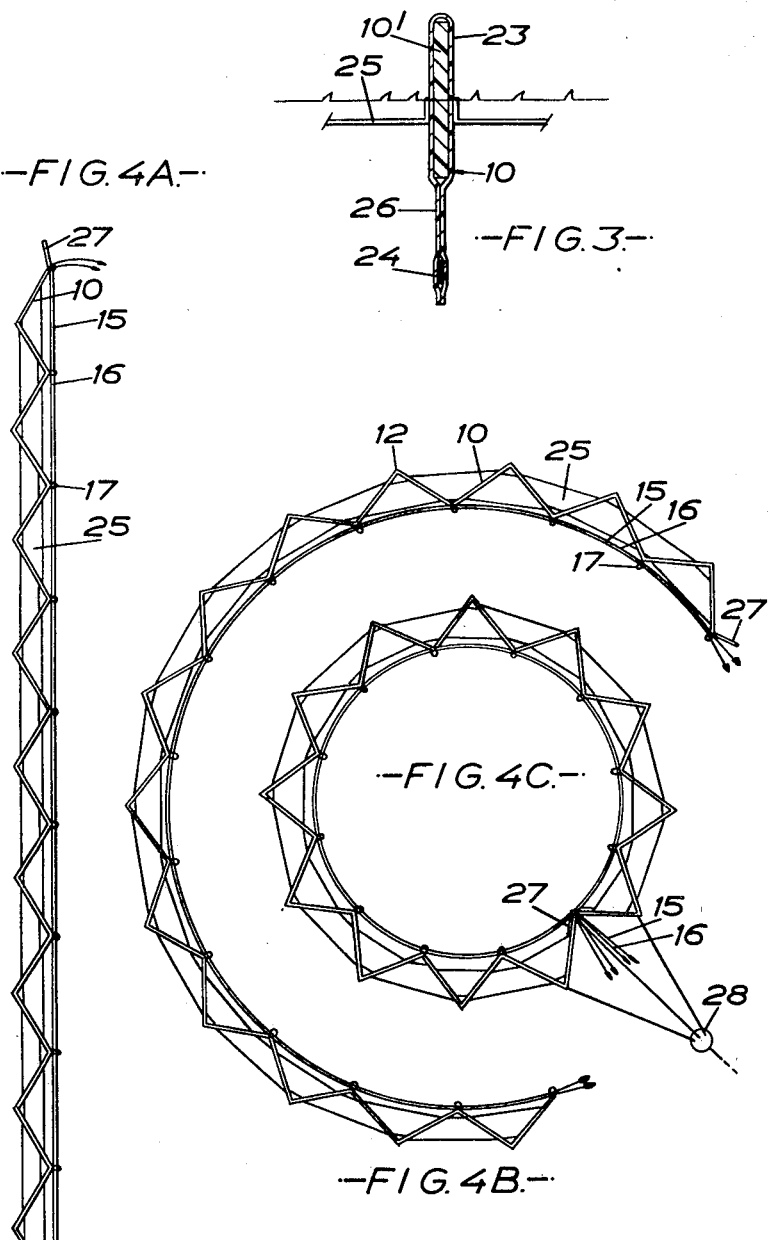

United States Patent Office 3,499,291
Patented Mar. 10, 1970

3,499,291
BOOM FOR SCREENING IN AND COLLECTING UP OF POLLUTION ON WATER
Trygve Mikkelsen, Straumesvingen 22,
Straumsgrend, Norway
Filed Nov. 5, 1968, Ser. No. 773,621
Claims priority, application Norway, Nov. 6, 1967, 170,406
Int. Cl. E02b 15/04, 3/00
U.S. Cl. 61—1                    12 Claims

ABSTRACT OF THE DISCLOSURE

A boom construction for closing off and collecting up pollution, especially oil contamination on areas of the sea. A boom which comprises a plurality of floatable and foldable flat sections linked together in the form of a zig-zag rail and provided with one or more purse lines arranged to fold said flat sections on being drawn in. In water the boom will provide an upstanding barrier above the surface of the water. The boom can be set up in a ring in the water and by hauling in the purse lines the closed-off area will be decreased. The boom is manufactured of individual plates of porous plastic covered and linked together by a pliable material which is durable to sea-water and oil. The purse lines are guided by rings at alternate links. Between adjacent links are connected bands to limit the flattening out of the boom.

---

The present invention relates to a boom for closing off and collecting up pollution on water, especially oil contamination on areas of the sea, which comprises a rail means of several flat sections linked together which are provided with floating means and if desired with ballast so that in water it forms a substantially vertical wall which projects some distance above the surface of the water in the form of a barrier and which is drawn together in order to restrict the screened-in area.

It often occurs that oil or similar materials escape by accident on to the water from boats or tank installations or are spread in another way over the surface of the sea. In order to prevent such escaped pollution from spreading and causing damage to beaches, vessels and sea birds, it is important to be able to collect it up. It is known to employ barriers or booms with which the pollution is ringed around and from which it can be sucked up after the boom is drawn together.

Boom constructions are known of the type referred to by way of introduction which comprise continuous rails of flexible material durable to sea-water which have secured thereon at the upper edge or on the side reinforcing floating means and at the lower edge are provided with the necessary ballast. Such booms are also known which comprise plate elements of wood, metal or another material enclosed in sleeves and connected to marking floats and an underlying ballast.

These known constructions are however burdened with a series of disadvantages. They have been bulky and space-demanding for storing on board a vessel or on land. They have in addition been very unstable in the sea, something which has not been sufficiently countered by the prominent floats sometimes used. The main disadvantages with the hitherto known boom constructions are however that they have to be hauled in when the encircled or bounded pollution surface is to be contracted. In addition they have been difficult to set up by reason of their poor stability and have required mooring if they should be left in the sea.

The object of the present invention is therefore to produce a boom for screening and collecting up of pollution on water which is free of the said disadvantages and which under all conditions will remain floating in an active, closing-off position and which allows itself to be contracted in a simple manner from one point while it lies on the water. A further object is to produce a boom which is the cheapest possible to manufacture and which readily allows itself to be transported and handled on setting up and hauling in.

According to the invention this can be achieved in that the boom is so linked together that in water it assumes a zig-zag form and is provided with at least one purse line with which it is folded together when the latter is drawn in.

The setting up of such a boom can be effected from a point on land, from a vessel or from an exposed driving anchor, and from this a vessel can go round and form an enveloping ring around the pollution. When the boom is sitting on the water its zig-zag form will make it very stable against the influence of wind and heavy seas.

After this the ends of the purse lines, and preferably two purse lines are employed, are hauled in. If the boom forms a closed ring in the sea this hauling in can take place from the anchoring point. Accordingly as the purse lines are hauled in while the boom stands in the water, the sections of the boom are folded more and more towards one another. The enveloped area will thus be made smaller without the boom having to be hauled in. Since this can take place from a point substantial advantages are achieved as compared with that which was known hitherto.

The boom can according to need be set up more or less permanently in the water and used as a barrier for contaminants which one reckons will appear on the surface of the water, for example in connection with garbage emptying or the loading or unloading of tankers. On hauling in the purse lines the bounded area can also be contracted so much that the thickness of the pollution layer, for example oil, permits removal by mechanical means, for example with oil pollution by pumping in a manner known per se.

The boom according to the invention can also be used in other ways than those which are described above. It can for example be employed as a drag boom while it is drawn between two vessels and thereafter pursed together for emptying. Furthermore the possibility exists of abandoning a pursed boom and then turning back to empty it later. This is made possible due to the great stability which the boom according to the invention has, especially in the pursed condition. It is an obvious requirement that such a boom is sufficiently marked off.

With respect to the production technique and storage such a boom is produced in definite, limited lengths. Since however the need for especially long booms can occur frequently, it is advantageous to design the boom's ends so that several booms can be coupled tightly together, in order to form the desired total length.

In a preferred embodiment the sections comprise plates of a material of low specific gravity which is covered with a material durable to sea-water and oil which at the same time forms links between adjacent sections. In this way the sections are completely smooth without projecting floats. Consequently they can be folded completely together and stored in the minimum of space. On setting up this means the further advantage that the securing of floats to the boom is not needed, and the latter will be able to glide out easily since it does not have projecting portions.

By reason of the fact that the boom is to be pursed together and not drawn in as with conventional booms, in order to carry out a contraction, the risk is reduced of soiling the vessel involved. The boom according to the invention can namely be pursed completely together in the water and drawn up as a folded unit after emptying is concluded.

The essential advantages of the boom according to the invention can be summed up as follows:

It demands little space and can therefore be stored in a small place on board a vessel. Since the boom is manufactured with built-in floating means the weight is reduced to a minimum. By virtue of the relatively low production costs it is thus possible for several vessels to carry the boom as a safety requirement.

It is completely smooth and without projecting portions and since it in addition has great rolling stability it is very easy to place on the water, even in rough seas. The only thing which is needed is an anchoring point for the end, for example in the form of a driving anchor.

By reason of the zig-zag form the boom will float very stably and retain its sealing function even in heavy seas. The linking causes the boom to be pliable adapting itself to the movements of the waves.

The contraction of the boom is effected very simply by means of the purse lines without any portion of the boom having to be drawn out of the water. The zig-zag form will in addition cause the boom to act as a wave breaker without losing its own function.

Further features and advantages of the present invention will be evident from the following description of examples of preferred embodiments having regarded to the accompanying drawings, in which:

FIG. 1 shows in perspective a section of a boom according to the invention equipped with rings for the reception of two purse lines and in a partly pursed condition.

FIG. 2 shows an alternative embodiment in a corresponding position.

FIG. 3 shows in cross-section through a section of a further modified embodiment.

FIGS. 4A, 4B and 4C show different stages in the setting up and pursuing together of a boom according to the invention, in which external auxiliary means, such as tug boats, driving anchors etc. are omitted.

In FIG. 1 there is illustrated a section of a boom of sections 10 linked together in which individual plates 10' of porous plastic are utilised as floating means. The plates 10' are substantially rectangular and are arranged following one another in a series with the shortest edges directed towards each other so that an elongated belt is formed. They are joined by means of a cover 11 of double-folded plastic impregnated nylon canvas or glass fibres which is connected to the plates by for example adhesion, while the covers are either engaged with adjacent plates or are jointed together by welding or adhesion. Between the section-forming plates 10' there are therefore formed joints or links 12 which are formed by the cover material. By virtue of the pliability of the cover the links and hence the boom attain the flexibility which is required for use in heavy seas.

The plates 10' can have a breadth of from 40 to 70 cm. and a length of from 50 to 200 cm., while the thickness can be about 1–2 cm., dependent upon which material is to be chosen. Besides porous plastic other materials can be utilised of low specific gravity. If a material is to be used which is not of fixed shape it may be necessary to provide the sections with a reinforcing, for example plate-shaped, insertion. In addition it must be observed that materials cannot be chosen of too low specific gravity, since this increases the need for ballast and can create stabilization problems.

As cover any material can be employed which is durable in sea-water and oil and which is strong enough to hold the sections 10 together and which besides can be manufactured sufficiently readily.

Along the lower edge of the sections 10, that is to say along the edge which is to stand down in the water, there is inserted as ballast a PV-pipe 13 having lead filling 14 between the plates 10' and the cover 11. Instead of lead filling other types of metal filling can be employed or an iron chain can be employed which is encased in a suitable manner. The weight dimensioning of the ballast must naturally be adapted to the weight of the boom's remaining parts having regard to the desired depth of submersion.

In addition to acting as a dead weight the ballast insertion 13 will also serve to reinforce the boom construction to a certain degree. The upper edge of the sections can also be reinforced by means of a strip-shaped insertion between the plate 10 and the cover 11.

The boom is provided with a lower purse line 15 of steel wire and an upper purse line 16 of synthetic rope. The number of purse lines can be varied, as for example only a purse line positioned centrally on one side of the boom may be used. However it has been found that two purse lines, one at the boom's lower edge and one at the boom's upper edge confer advantageous characteristics to the boom. It is possible to use other line types or combinations of line types than those which are mentioned.

For sewing and guiding the purse lines 15 and 16 in the boom there are arranged at alternate links 12 guide means in the form of purse rings 17 for example of brass, if desired with a protective cover at the boom's lower and the boom's upper edges, so that both the purse lines 15 and 16 are located on the same side of the boom. The rings 17 are led through the cover 11 and are anchored in two reinforcing strips 18 of textile or a similar pliable and strong material, which extend longitudinally of the boom below the cover 11 on the opposite side from the rings 17. Besides serving as an anchoring for the rings 17 the reinforcing strips 18 take up a large portion of the forces which act on the links 12.

By making the maximum portion of the purse lines 15 and 16 which is located between the boom's ends somewhat shorter than the boom's flattened-out length the boom is forced on use to occupy a zig-zag form. Furthermore in order to ensure that portions of the boom do not flatten out during use one can, as shown in FIG. 1, arrange slings 19 between the rings 17, which only permit the adjacent, ring-carrying links 12 to be separated by a certain distance from each other. The slings 19 can be composed of plastic cords or another suitable material.

It is also possible to employ floating means of a material which is sufficiently rigid and has a closed surface so that it can be used without a cover as shown in FIG. 2. The sections 10 can then be joined together by means of strips 20, for example of PV-coated nylon canvas which are welded or secured in another way to the plates 10'. Here there can be employed the previously described type of guide means for the purse lines 15 and 16.

As an alternative solution the guide means can be integrated into the sections 10 by being constructed as holes 21 in the latter. The disposition of the holes 21 corresponds to the disposition of the above-described rings, that is to say, at alternate links 12 at the boom's lower and the boom's upper edges. In this way the joining strips 20 are used simultaneously as hole-reinforcing means. An alternative embodiment (not shown) is to utilise a single purse line led through a hole centrally on each section. This can if desired be reinforced by means of suitable linings.

The holes 21 will in all cases provide such a positioning of the sections 10 that they cover each other when the sections are folded completely together.

In the embodiment which is illustrated in FIG. 2 the ballast, which can be as described above, is united with the plate 10' by means of a strip 22 which is fastened to the plate.

FIG. 3 shows a section through a further modification of the invention, in which there are also utilised inserted plate-shaped floating means 10' of a foam material of fixed shape. The cover is formed here of a double-layered rail 23 of plastic-reinforced glass fibre canvas which surrounds the plate 10' and which receives a band-shaped ballast material 24 at the lower edge of the section. For this construction the plate is not formed over the whole breadth of the boom, but is instead made so much smaller that an intermediate space is formed between the ballast and the floating means. In this way it is possible to save in floating material.

This figure shows in addition a further advantageous form of connecting means between the individual abutting sections. At the side of the section, that is to say to the cover 23, there is adhered a band 25 having a breadth which is somewhat less than the individual length of the section. As is evident from FIGS. 4A–C, which show a boom of this design, these bands are of trapezoidal shape. In FIG. 4A they are illustrated fully stretched. The connected bands 25 can be manufactured from any appropriate material which is sufficiently flexible to permit free folding-together of the boom.

The connecting bands 25 serve two purposes. Firstly they limit the boom's levelling out on setting up and before hauling in the purse lines, which are described earlier. Further they form a stabilising element in heavy seas and under the influence of wind. Such connecting bands increase the boom's sluggishness to wave movement and prevent oil from being washed over the boom. Normally the bands will be immersed in the water and thus restrain any vertically directed movement of the boom.

FIG. 4A shows a boom which is set up in a straight line on the water and is levelled out to a maximum. The connecting pieces 27 are then tightly stretched between the adjacent sections and the boom has a zig-zag shape which gives it a large breadth and consequently the large rolling stability.

The setting up can be accomplished in several different ways, but requires in all cases the use of a boat. On setting up from land the purse lines 15 and the drag rope from a crow foot (not shown) which is connected to the one end section is secured to the land. The sections 10 are afterwards dropped in the sea with the purse lines 15 and 16 through the guide rings 17. The boom can now be drawn out to its full length while the setting up vessel proceeds in an arc out from land or out towards an anchoring point in the water. The other end of the boom can be so moored in a corresponding manner to the first end.

Instead of utilising a land-fast anchoring point for the first end a driving anchor, another vessel or another appropriate anchoring in the sea can also be used.

In FIG. 4B the boom's ends are drawn towards each other to form a ring, but without the purse lines 15, 16 being drawn in. The boom will therefore be levelled out about as much as possible while the connecting bands 25 at the outer side remain tight while the connecting pieces on the inner side are drawn together correspondingly to the curve.

In FIG. 4C the ends of the boom are brought completely together into a closed ring and in addition are connected by a hauling arrangement. By means of a connecting means 27 the two ends are connected to each other. The connecting means 27 comprises a flap which resembles the strip 20 in having a breadth which corresponds to the distance between the purse lines and which is firmly connected to the boom's one end section, while the other end section is provided with means of a suitable kind for detachably receiving the flap. This connecting system can be utilised in addition for joining together several boom units.

The vessel which effects the setting up or which serves as an anchor can be disposed within or outside the closed ring. In the figure however it is required that the vessel be located outside the ring.

When the boom is closed as described further steps depend upon the object of the setting up. If one desires to collect up the contaminants immediately, the boom is pursed together by hauling in the purse lines 15 and 16. For this purpose a winch can be arranged either on board the vessel which is to operate the boom or on land if hauling in is to be carried out from there. On hauling in the purse lines the closed-off area is contracted and possible contaminants are collected on a smaller surface. The emptying of the contaminants which are collected up can be effected in the same way as with known boom constructions.

In individual cases the boom is allowed to remain standing permanently in the sea, either because further contaminants are to be collected up or because there is no opportunity to effect the necessary emptying. If the boom is to be secured to land or to a stationary vessel it can simply remain standing. By virtue of the boom's great stability it can also be left in the open sea without a stabilising mooring. Obviously it is necessary to secure it to a driving anchor as on setting up, in order to prevent drifting and also to provide it with its necessary marking. Known types of booms permit use in this manner with difficulty.

In addition it is possible to take the boom in tow, for example in order to lead it over to smooth seas where easier emptying can be carried out. FIG. 4C illustrates how the boom is connected to the tow rope by means of a so-called crow foot 28. With this a connection is established to the joining point and to the adjacent links.

An especially advantageous use of the present boom is in connection with loading and unloading of tankers in the open sea. By means of the boom there can be set up a permanent barrier around the whole ship, which remains reliably closed even during difficult weather conditions. The boom will at the same time act as a wave breaker and provide smoother working conditions.

What I claim is:

1. A boom for screening off and facilitating the collection of pollution on the surface of water which comprises a plurality of floatable and foldable flat sections linked together in the form of a zig-zag rail to provide above the surface of the water a substantially upstanding barrier and at least one purse line arranged to fold said sections on being drawn in thereby enabling an already screened-off surface area of water to be contracted.

2. A boom according to claim 1, wherein the sections include ballast.

3. A boom according to claim 1, wherein the sections comprise plates composed of a material of low specific gravity covered with a material durable to sea-water and oil, the latter material forming a link between adjacent sections.

4. A boom according to claim 3, wherein the low specific gravity material is a foam rubber of fixed shape and the durable cover material is a glass fibre canvas impregnated with a plastic material.

5. A boom according to claim 1, wherein the sections are linked by connecting strips.

6. A boom according to claim 1, herein guide means for the at least one purse line are arranged at alternate links.

7. A boom according to claim 6, herein the guide means constitute a hole formed in each section.

8. A boom according to claim 2, wherein the ballast is a band or cord-shaped material of high specific gravity arranged in a protective sleeve at the lowermost edge of the sections.

9. A boom according to claim 1, wherein means for limiting the unfolding of the sections are arranged between adjacent sections.

10. A boom according to claim 9, wherein the limiting means are connected to alternate links between the sections.

11. A boom according to claim 9, wherein the limiting means is in the form of a connecting band which is substantially horizontal when stretched out.

12. A boom according to claim 11, wherein the connecting band is trapezoidal and adheres to the sides of the adjacent sections.

(References on following page)

References Cited

UNITED STATES PATENTS

| | | | |
|---|---|---|---|
| 2,682,151 | 6/1954 | Simpson et al. | 61—1 |
| 2,875,546 | 3/1959 | Weathersby | 61—1 |
| 3,184,923 | 5/1965 | Galvaing | 61—1 |
| 3,321,923 | 5/1967 | Smith et al. | 61—1 |
| 3,369,664 | 2/1968 | Dahan | 61—1 |

PETER M. CAUN, Primary Examiner

U.S. Cl. X.R.

61—5